Inventor:
Marchand B. Hall
By Lee J. Gary Atty.

Inventor:
Marchand B. Hall
By Lee J. Gary Atty.

Inventor:
Marchand B. Hall
By Lee J. Gary Atty.

Inventor:
Marchand B. Hall
By Lee J. Gary Atty.

Patented Nov. 27, 1951 2,576,682

UNITED STATES PATENT OFFICE 2,576,682

APPARATUS FOR LOADING RECORD STRIPS INTO RECORD FRAMES

Marchand B. Hall, Chicago, Ill., assignor to Acme Visible Records, Inc., Chicago, Ill., a corporation of Delaware Application January 26, 1950, Serial No. 140,696

12 Claims. (Cl. 40—63)

The present invention relates to an apparatus for loading flexible record strips into record frames of the type used with visible index or visible record equipment.

As described in Patent 1,594,112, issued July 27, 1926, to Frank D. Powell, record strips are provided in sheet or roll form for use in visible index and record equipment, the sheet or roll of record strips comprising a relatively thin resilient wood veneer surfaced on both sides with paper and scored transversely through the upper sheet of paper and the wood veneer to form a chain of hingedly connected record strips adapted to be inserted into a typewriter, addressing machine, duplicating machine or punched card machine printer for applying information to the record strips. After the desired information has been applied to the chain of connected record strips, the strips may be manually separated from each other or may be separated from each other by means of the apparatus shown and described in my copending patent application filed January 26, 1950, Serial No. 140,695. As set forth in my copending application, the record strips are separated from each other and then discharged into a hopper frame which maintains the severed strips in side-by-side abutting relation, the loaded hopper frame being removable from the apparatus for use in the loading apparatus hereinafter shown and described.

It has heretofore been the practice to manually insert the individual record strips into a record frame of the type shown and described in Patent 1,854,807, issued April 19, 1932, to Frank D. Powell. The present invention contemplates the provision of an apparatus adapted for use in simultaneously loading a large number of record strips into a record frame.

This invention further contemplates the provision of an apparatus adapted for use in transferring a plurality of individual record strips from a hopper frame, of the type shown and described in my copending patent application, to a record frame.

This invention further contemplates the provision of an apparatus which is relatively simple and inexpensive in construction and which will not readily get out of order.

This invention embodies other novel features, details of construction and arrangement of parts which are hereinafter set forth in the specification and claims, and illustrated in the accompanying drawings, wherein:

Figure 1:
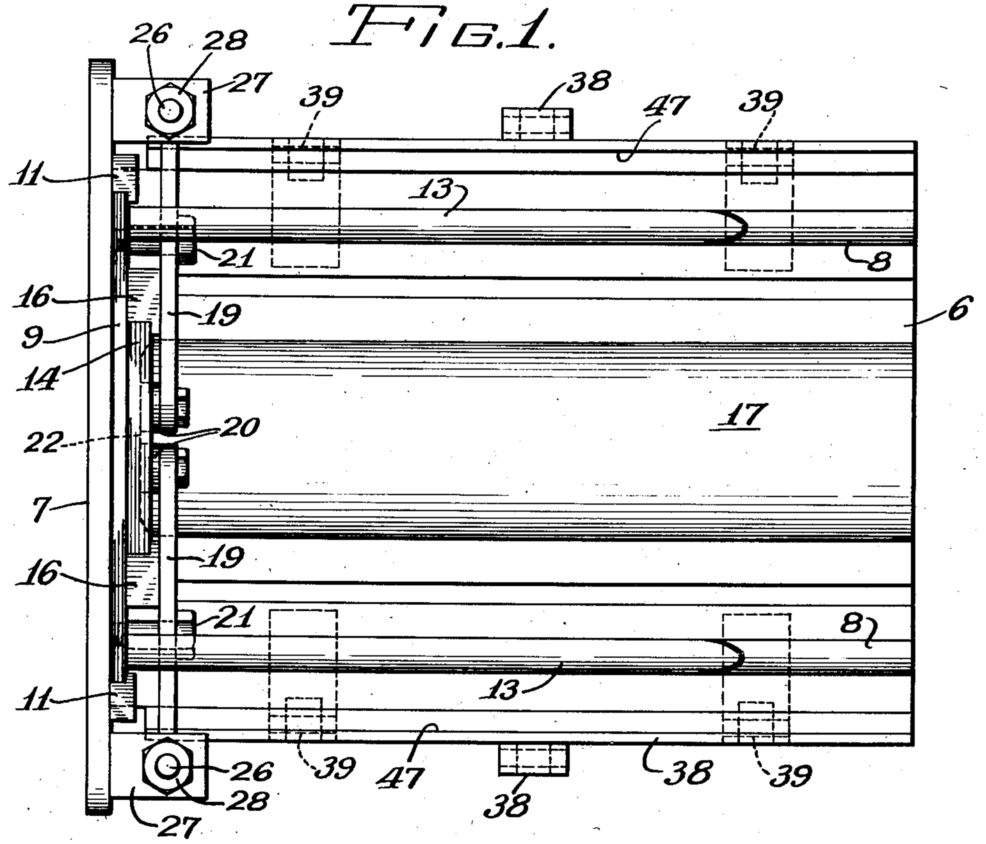
Fig. 1 is a top plan view showing an apparatus embodying features of the present invention.
Figure 2:
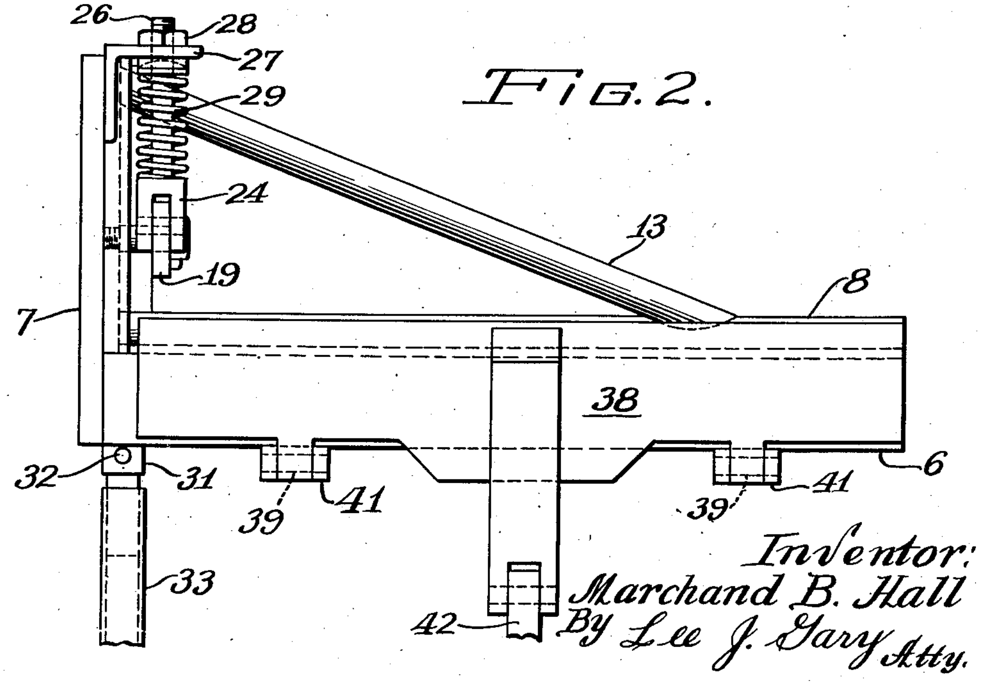
Fig. 2 is a side elevational view of same.
Figures 3, 4:
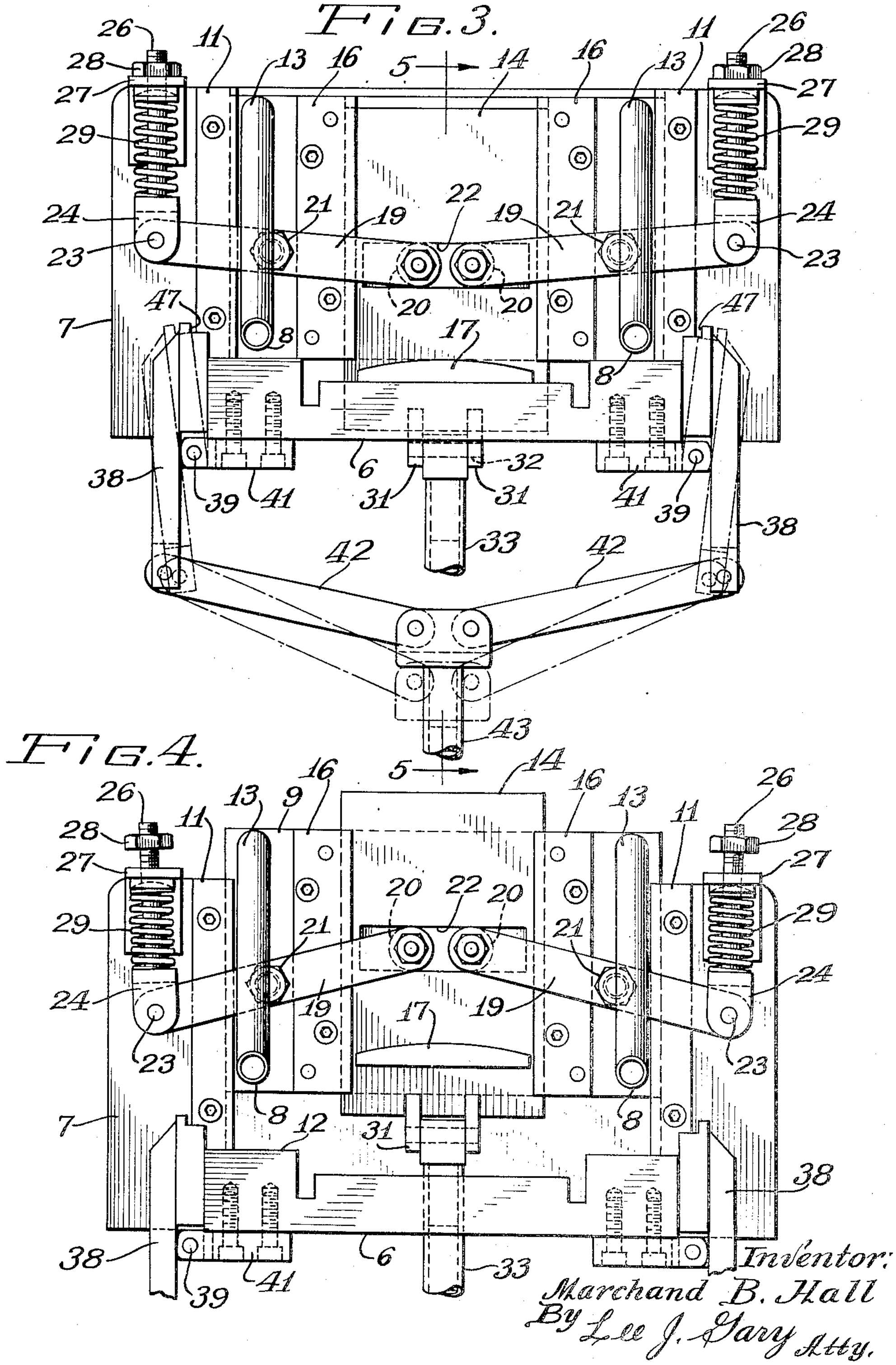
Fig. 3 is a front elevational view of same, illustrating the several parts in their lowered positions.
Fig. 4 is a front elevational view, corresponding to Fig. 3, illustrating the positions of the parts of the apparatus in their raised positions.

Figs. 6 to 11, inclusive, are schematic views illustrating the relative movement of parts of the apparatus in transferring a plurality of flexible record strips from a hopper frame to a record frame.

Referring now to the drawings for a better understanding of this invention, the apparatus illustrated therein is adapted for use in transferring flexible record strips S from a hopper frame H to a record frame F in the manner illustrated schematically in Figs. 6 to 11. The hopper frame H is shown and described with greater particularity in my copending application filed January 26, 1950, Serial No. 140,695, and comprises generally two sets of arms mounted on an end frame and projecting outwardly therefrom in spaced parallel relation, the arms defining passageways to receive a plurality of record strips S in side-by-side abutting relation. The record frame F is shown and described with greater particularity in Patent 1,854,807, issued April 19, 1932, to Frank D. Powell, and comprises generally a sheet metal panel P provided with channel-shaped side members C—C to define recesses to receive and engage the ends of the record strips S.

The apparatus is shown as comprising a base plate 6 having a carriage supporting plate 7 welded or bolted to its back end, said plate projecting upwardly in a plane normal to the plane of the base. A pair of strip bending arms 8—8 are welded at their inner ends to an outer carriage 9 which is guided for vertical reciprocative movement along the inner face of the end plate 7 by means of guide members 11—11. The outer carriage 9 is movable vertically in a plane normal to the upper surface 12 of the base plate 6, and the arms 8—8 project outwardly in spaced parallel relation in a plane normal to the outer carriage. Each arm 8 is provided with a reinforcing member 13 welded at its one end to the carriage 9 and at its other end to the arm to maintain the arm in parallel relation at all times to the upper surface 12 of the base plate 6. An inner carriage 14 is guided for vertical reciprocative movement upon the face of the outer carriage 9 by means of guide members 16—16 provided on the outer carriage. A record strip supporting platform 17 is secured at its end to the face of the inner carriage 14 and projects outwardly therefrom in a plane parallel to the upper surface 12 of the base plate 6. The strip supporting platform has a width approximately ⅓ of the length of the strips S and is preferably formed with an arcuate upper surface 18 to prevent breakage of the record strips when the latter are bent for insertion into a record frame F. A pair of rocker arms 19—19 are pivotally mounted intermediate their ends upon shoulder screws 21—21 threaded into the outer carriage 9. The inner ends of the rocker arms 19—19 are provided with rollers 20—20 guided for movement in a slot 22 formed in the inner carriage 14, and the outer ends of the arms are pivotally connected at 23—23 to the bifurcated heads 24—24 of bolts 26—26. Angle brackets 27—27 are secured to the inner face of the carriage supporting plate 7 and are formed with apertures to slidably receive the bolts 26—26. Nuts 28—28 are threaded onto the outer ends of the bolts 26—26, and compression springs 29—29 are mounted on the bolts between their bifurcated heads 24—24 and the angle brackets 27—27 to yieldably resist upward movement of the bolts.

Figure 5:
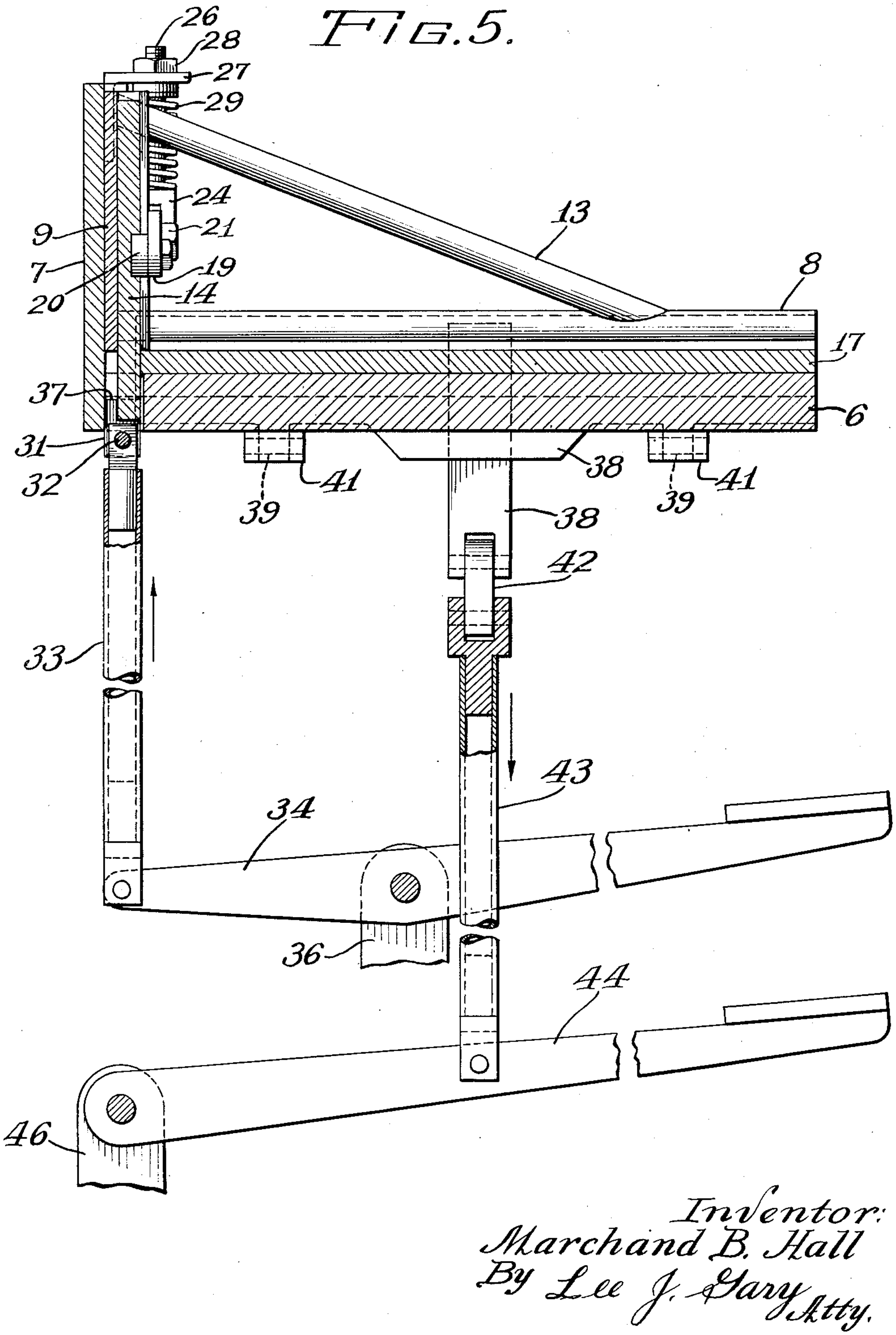
Fig. 5 is a sectional view taken along the line 5—5 of Fig. 3.
Figure 11:
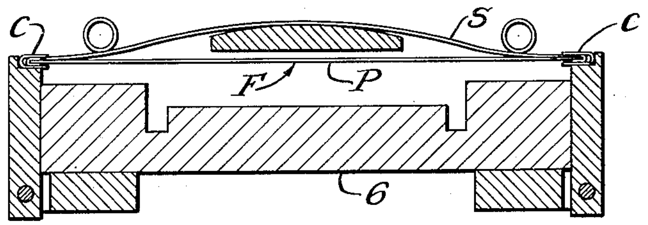
Figure 10:
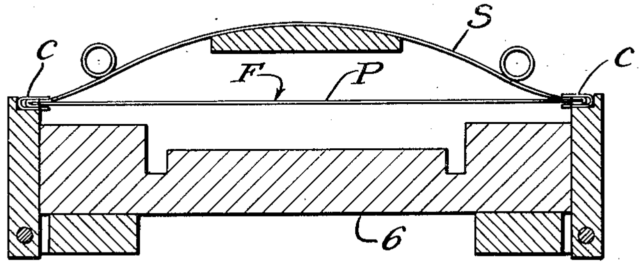
Figure 9:
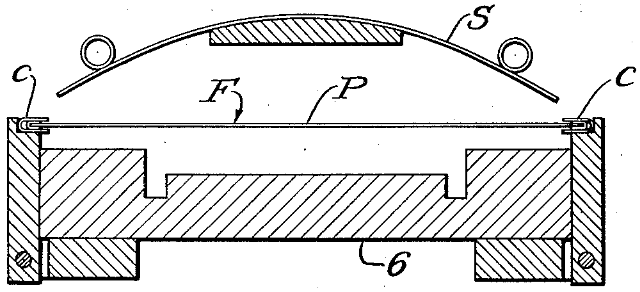

A pair of apertured ears 31—31 are provided on the lower end of the inner carriage 14 to receive a connecting pin 32. A connecting rod 33 is journaled at its upper end on the pin 32 and is pivotally connected at its lower end to a foot pedal 34. The foot pedal is journaled intermediate its ends upon a suitable bearing bracket 36. The base plate 6 and the bearing bracket 36 are adapted to be supported upon a suitable table or other structure (not shown). As illustrated more clearly in Fig. 5 of the drawings, the ears 31—31 project rearwardly from the inner carriage 14 to provide a shoulder 37 for engagement against the lower edge of the outer carriage 9 when the inner carriage is moved upwardly.

A pair of strip aligning arms 38—38 are pivotally mounted intermediate their ends at 39—39 upon bearing brackets 41—41 secured to the base plate 6. The strip aligning arms 38—38 extend along opposite sides of the base plate 6 with their upper ends projecting above the upper surface 12 of the base plate. Connecting links 42—42 are pivotally connected at their outer ends to the lower ends of their respective strip aligning arms 38—38, the inner ends of the connecting links being pivotally connected to a connecting rod 43. The connecting rod 43 is pivotally connected at its lower end to a foot pedal 44 mounted upon a bearing bracket 46. The upper ends of the strip aligning arms 38—38 are formed with opposing recesses 47—47 to receive the sides of a record frame F.

Figure 8:
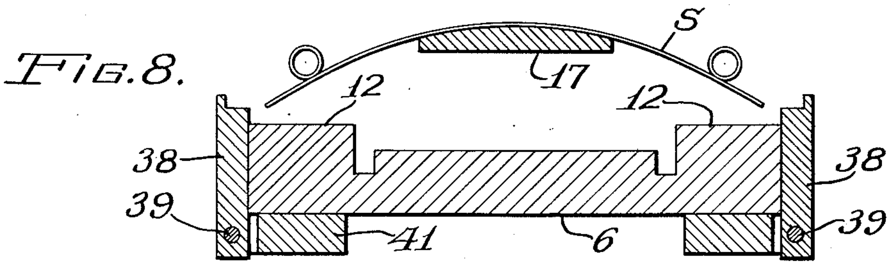
Figure 7:
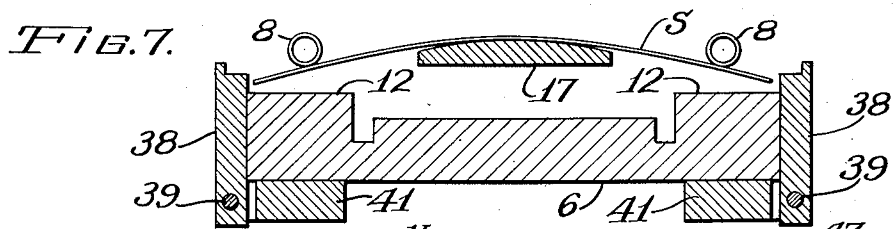
Figure 6:
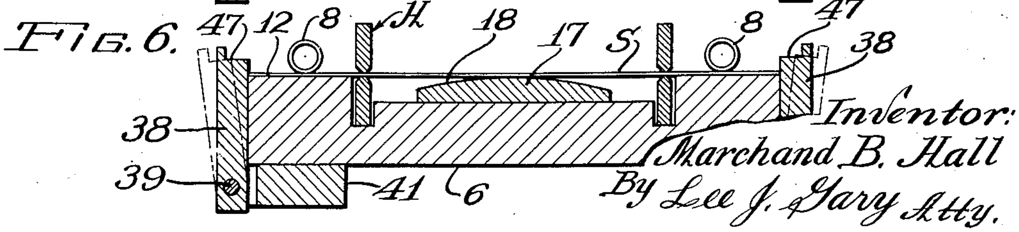

In the operation of the apparatus thus shown and described in transferring a plurality of flexible record strips S from a hopper frame H to a record frame F, a hopper frame H loaded with record strips S is first positioned upon the base plate 6 in the manner illustrated schematically in Fig. 6. The free end of the foot pedal 44 is then manually raised to pivot the arms 38—38 inwardly toward the base plate 6 to align the edges of the strips S and to hold the strips in position during withdrawal of the hopper frame H. The foot pedal 34 is then actuated to raise the inner carriage 14 relative to the outer carriage 9 to cause the strip supporting platform 17 to coact with the bending arms 8—8 to bend the ends of the strips S downwardly along an arcuate line, as illustrated in Figs. 7 and 8. When the inner carriage 14 and its strip supporting platform 17 reach an intermediate position, illustrated schematically in Fig. 8, the shoulders 37 provided on the inner carriage engage against the lower edge of the outer carriage 9. Further upward movement of the inner carriage 14 thus acts to raise the outer carriage 9 to prevent further relative movement between the strip supporting platform 17 and the strip bending arms 8—8. When the inner and outer carriages reach their upper positions, as illustrated schematically in Fig. 9, a record frame F is mounted upon the upper ends of the strip aligning arms 38—38 to receive the record strips S. During initial lowering movement of the inner and outer carriages, these carriages move as a unit to prevent relative movement between the strip supporting platform and the strip bending arms, as illustrated schematically in Fig. 10. After the ends of the strips S have been engaged within the channels formed along the sides of the record frame F, the inner and outer carriages are lowered until the strip supporting platform 17 and the strip bending arms 8—8 are disposed in the positions illustrated schematically in Fig. 11. The record strips S and the record frame F are then manually withdrawn toward the front end of the machine and beyond the outer end of the strip supporting platform 17 to complete the operation of loading a record frame with record strips.

While this invention has been shown in but one form, it is obvious to those skilled in the art that it is not so limited but is susceptible of various changes and modifications without departing from the spirit and scope of the claimed invention.

I claim as my invention:

1. In an apparatus for loading resilient record strips upon a record frame, a base to support a plurality of record strips in side-by-side abutting relation, guide means projecting upwardly from said base, an outer carriage mounted on said guide means for vertical movement relative to said base, an inner carriage mounted for vertical movement relative to said base and said outer carriage, a strip supporting platform secured at its end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, and means to move said carriages relative to said base and each other.

2. In an apparatus for loading resilient record strips upon a record frame, a base to support a plurality of record strips in side-by-side abutting relation, an outer carriage mounted for vertical movement relative to said base, an inner carriage mounted for vertical movement relative to said base and said outer carriage, a strip supporting platform secured at its end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, means to move said carriages relative to said base and each other, and aligning arms to engage and align the ends of record strips arranged on said base.

3. In an apparatus for loading resilient record strips upon a record frame, a base to support a plurality of record strips in side-by-side abutting relation, guide means projecting upwardly from said base, an outer carriage mounted on said guide means for vertical movement relative to said base, an inner carriage mounted for vertical movement relative to said base and said outer carriage, a strip supporting platform secured at its end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, means to move said carriages relative to said base and each other, and means to support a record frame above the upper surface of said base.

4. In an apparatus for loading resilient record strips upon a record frame, a base to support a plurality of record strips in side-by-side abutting relation, guide means projecting upwardly from said base, an outer carriage mounted on said guide means for vertical movement relative to said base, an inner carriage mounted for vertical movement relative to said base and said outer carriage, a strip supporting platform secured at its end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, means to raise and lower said inner carriage, and means operable responsive to movement of said inner carriage to raise and lower said outer carriage.

5. In an apparatus for loading resilient record strips upon a record frame, a base to support a plurality of record strips in side-by-side abutting relation, guide means projecting upwardly from said base, an outer carriage mounted on said guide means for vertical movement relative to said base, an inner carriage mounted for vertical movement relative to said base and said outer carriages, a strip supporting platform secured at its end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, means to raise and lower said inner carriage, and means operable responsive to movement of said inner carriage to raise and lower said outer carriage at a relatively slower rate of speed whereby said platform and bending arms coact to alternately bow and straighten said record strips.

6. In an apparatus for loading resilient record strips upon a record frame, a base to support a plurality of record strips in side-by-side abutting relation, an outer carriage mounted for vertical movement relative to said base, an inner carriage mounted for vertical movement relative to said base and said outer carriage, a strip supporting platform secured at its end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, means to move said carriages relative to said base and each other, a pair of strip aligning arms pivotally mounted in spaced parallel relation on opposite sides of said base to engage and align the ends of record strips arranged on said base, and means to actuate said aligning arms.

7. In an apparatus for loading resilient record strips upon a record frame, a base to support a plurality of record strips in side-by-side abutting relation, an outer carriage mounted for vertical movement relative to said base, an inner carriage mounted for vertical movement relative to said base and said outer carriage, a strip supporting platform secured at its end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, means to move said carriages relative to said base and each other, a pair of strip aligning arms pivotally mounted in spaced parallel relation on opposite sides of said base to engage and align the ends of record strips arranged on said base, and means to actuate said aligning arms, the upper ends of said aligning arms being formed to receive and support a record frame in spaced parallel relation above said base.

8. In an apparatus for loading resilient record strips upon a record frame, a base to support a plurality of record strips in side-by-side abutting relation, an outer carriage mounted for vertical movement relative to said base, an inner carriage mounted for vertical movement relative to said base and said outer carriage, a strip supporting platform secured at its end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, means to raise and lower said inner carriage, a pair of rocker arms pivotally mounted intermediate their ends upon said outer carriage, means provided on said inner carriage to engage the inner ends of said rocker arms, a back plate provided on said base to support said outer carriage, a pair of apertured bolt brackets secured to said back plate, a pair of bolts mounted on said bolt brackets, the outer ends of said rocker arms being pivotally connected to the head portions of their respective bolts, a nut threaded onto the outer end of each bolt, and helical compression springs mounted on said bolts between their heads and their respective bolt brackets to yieldably resist upward movement of the outer ends of said rocker arms.

9. In an apparatus for loading resilient record strips upon a record frame, a base to support a plurality of record strips in side-by-side abutting relation, guide means projecting upwardly from said base, an outer carriage mounted on said guide means for vertical movement relative to said base, guide members provided on said outer carriage, an inner carriage slidably mounted on said outer carriage and guided for vertical reciprocative movement by said guide members, a strip supporting platform secured at its one end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, and means to move said carriages relative to said base and each other.

10. In an apparatus for loading resilient record strips upon a record frame, a base to support a plurality of record strips in side-by-side abutting relation, guide means projecting upwardly from said base, an outer carriage mounted on said guide means for vertical movement relative to said base, guide members provided on said outer carriage, an inner carriage slidably mounted on said outer carriage and guided for vertical reciprocative movement by said guide members, a strip supporting platform secured at its one end to said inner carriage and projecting outwardly therefrom to engage the medial portion of record strips arranged on said base, the upper surface of said strip supporting platform being formed arcuate in transverse section, a pair of bending arms having their one ends secured to said outer carriage and projecting outwardly therefrom on opposite sides of and parallel to said platform to engage the end portions of record strips arranged on said base, and means to move said carriages relative to said base and each other.

11. In an apparatus for loading resilient record strips upon a record frame, a base to support a plurality of record strips in side-by-side abutting relation, guide means projecting upwardly from said base, an outer carriage mounted on said guide means for vertical movement relative to said base, guide members provided on said outer carriage, an inner carriage slidably mounted on said outer carriage and guided for vertical reciprocative movement by said guide members, a strip supporting platform secured at its one end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, means to move said inner carriage relative to said base, and means operable responsive to movement to said inner carriage to move said outer carriage relative to said base and said inner carriage.

12. In an apparatus for loading resilient record strips upon a record frame, a base to support a plurality of record strips in side-by-side abutting relation, guide means projecting upwardly from said base, an outer carriage mounted on said guide means for vertical movement relative to said base, guide members provided on said outer carriage, an inner carriage slidably mounted on said outer carriage and guided for vertical reciprocative movement by said guide members, a strip supporting platform secured at its one end to said inner carriage and projecting outwardly therefrom to engage the medial portion of record strips arranged on said base, a pair of bending arms having their one ends secured to said outer carriage and projecting outwardly therefrom on opposite sides of and parallel to said platform to engage the end portions of record strips arranged on said base, means to move said inner carriage relative to said base, and a pair of rocker arms operable responsive to movement to said inner carriage to move said outer carriage relative to said base and said inner carriage.

MARCHAND B. HALL.

REFERENCES CITED

The following references are of record in the file of this patent:

UNITED STATES PATENTS

| Number | Name | Date |
|---|---|---|
| 1,736,395 | Dunning | Nov. 19, 1929 |
| 2,494,233 | Feldstein et al. | Jan. 10, 1950 |